United States Patent Office 2,865,779
Patented Dec. 23, 1958

2,865,779

SILICA PIGMENT AND PREPARATION THEREOF

Edward M. Allen, Doylestown, Ohio, assignor to Columbia-Southern Chemical Corporation, a corporation of Delaware No Drawing. Application June 24, 1955
Serial No. 517,919

8 Claims. (Cl. 106—306)

This invention relates to an especially useful type of siliceous pigment which can be prepared by an unusually economical process. It is common knowledge that silica or hydrated silica may be prepared by the reaction of certain salts of silicic acid with acids whereby, upon acidification, silica is formed. It is also common knowledge that many of the types of silica thus prepared are not suited for use as reinforcing pigments in rubber and paper compositions for the reason that the dried product is either too highly agglomerated or is insufficiently fine for the purpose.

By following special precautions it is possible to prepare a finely divided precipitated silica which is useful as a rubber or paper pigment. Such silica which is now on the market has an average ultimate particle size below 0.05 micron. Because of its small particle size recovery of such silica from the aqueous medium in which it is produced is quite expensive since settling and filtration processes are slow and thus a large amount of expensive equipment is necessary, even for a relatively low rate of production.

In accordance with the present invention a novel type of siliceous pigment has been made which not only has excellent properties and is particularly useful in the reinforcement of rubber compositions but also settles rapidly and can be filtered readily from aqueous medium. Hence, the pigment herein contemplated can be made at a low cost.

The novel pigment herein contemplated comprises a finely divided hydrated silica having an average ultimate particle size below 0.1 micron, preferably 0.01 to 0.05 micron, and finely divided alkaline earth metal sulfite having an average ultimate particle size below about 10 microns, preferably in the range 0.01 to 2 microns. The ultimate particle size stated above may be determined readily by photomicrograph obtained using the electron microscope. This pigment may be prepared by introducing a finely divided alkaline earth metal sulfite into an aqueous slurry of silica which may be prepared as described below.

Preparation of the aqueous slurry of silica using the aforementioned method must be so governed that the siliceous material resulting is pigmentary in character. A useful pigmentary silica should have an ultimate size of, say, less than 0.1 micron, preferably 0.01 to 0.05 micron. However, such fine particles settle and/or filter slowly. This inherent difficulty obviously renders the preparation thereof difficult, as set forth above.

The preparation of an alkaline earth metal sulfite pigment, such as calcium sulfite, is complicated because the particles agglomerate during drying, i. e., the individual particulates tend to cohere and form hard undesirable flocs or agglomerates which do not disperse well in rubber.

The present invention provides a novel method of avoiding the above difficulties and offers a unique and simple process for preparing a very desirable and novel product. Briefly, the method involves forming a silica slurry in pigmentary form and introducing therein an alkaline earth metal sulfite, such as calcium sulfite, and recovering the silica-alkaline earth metal sulfite mixture from the product slurry. Alternatively, the product slurry itself may be compounded with rubber latex, paper pulp, and so forth.

Although the alkaline earth metal sulfite may be precipitated prior to introduction into the silica slurry, it is preferably precipitated in situ in the preformed silica slurry. This may be accomplished in several ways.

According to one method, a silica slurry comprising silica dispersed in an aqueous solution containing sulfite ions and calcium ions is formed and calcium sulfite is precipitated by decreasing the acidity of the solution to the point where precipitation of calcium sulfite can take place.

Such a slurry of silica may be prepared conveniently by reacting an alkaline earth metal silicate, such as calcium silicate, having an average ultimate particle size below 0.1 micron with an amount of sulfur dioxide or sulfurous acid, or acid salt thereof, in excess of that stoichiometrically required to react with the CaO of the calcium silicate to produce calcium sulfite and thereby form an aqueous acidic solution having dispersed therein alkaline earth metal ions, sulfite ions and finely divided silica and containing little or no precipitated calcium sulfite. The acidity of the solution is then reduced, preferably at a rapid rate, to precipitate an alkaline earth metal sulfite. Alkaline earth metal bisulfites, such as calcium bisulfite, may be substituted in this process for either the sulfurous acid or sulfur dioxide.

The calcium silicate hereinabove discussed may be conveniently prepared by reacting an aqueous sodium silicate solution and an aqueous calcium chloride solution in a centrifugal pump. Example I, infra, teaches a typical method of preparing finely divided calcium silicate useful in the present process.

When preparing the novel pigment of the present invention in situ from an alkaline earth metal silicate slurry, such as calcium silicate, a very convenient method involves reacting said silicate slurry with sulfurous acid (either as such or as the anhydride $SO_2$) to a pH of about 4, although a range from 1.5 to about 6 is suitable, and neutralizing the acidic reaction product to a pH of about 6.5, usually not over 10 and preferably about 7.5. It is desirable to execute this neutralization step rapidly, otherwise the calcium sulfite produced may be present in the form of large crystals or agglomerates.

The solubility of calcium sulfite at pH ranges from 6.5 to 10 is very low. Hence, by lowering the pH to about 4 in the course of reacting calcium silicate or like alkaline earth metal silicate with sulfurous acid, calcium sulfite goes into solution and, by rapid neutralization, formation of coarse particles of calcium sulfite is avoided or minimized. It is desirable to have a certain degree of agitation during this neutralization step.

Where the novel silica of this invention is prepared in situ from calcium silicate using sulfurous acid or its anhydride $SO_2$, the calcium sulfite to $SiO_2$ proportion should be, preferably, 0.5 mol calcium sulfite per mol of $SiO_2$, although 0.1 to 0.75 mol calcium sulfite per mol of $SiO_2$ may be present.

Material other than calcium sulfite and $SiO_2$ may be present in the novel pigment. For instance, when the pigment prepared in situ by reacting calcium silicate with sulfurous acid has a pH of about 4 and calcium silicate in excess of that required to neutralize the pigment solution is added, the excess calcium silicate then appears in the final product. By the same token, calcium carbonate may be used instead of calcium silicate in this neutralization step.

According to a preferred embodiment of this invention the precipitation may be effected with such rapidity that the precipitation of substantially all of the calcium sulfite in any portion of the resulting slurry thereof will take place within one minute, usually about 30 seconds, from the time of commencement of substantial calcium sulfite precipitation in such portions, i. e., precipitation of calcium sulfite or like alkaline earth metal sulfite is discontinued within one minute of commencement of substantial precipitation of this material in such slurry.

In the practice of a still further embodiment, a slurry of silica dispersed in an aqueous solution of sulfurous acid, or the like, may be reacted with a calcium salt to precipitate calcium sulfite. Thus, an alkali metal silicate, such as sodium silicate, may be reacted with an acid, such as sulfurous acid, and silica precipitated therefrom. This silica slurry is then reacted with an alkaline earth metal compound having a greater solubility in an aqueous medium than its corresponding alkaline earth metal sulfite. More particularly, an aqueous slurry containing finely divided precipitated pigmentary silica and sulfite ions may be reacted with an alkaline earth metal compound such as calcium chloride, calcium acetate, calcium nitrate, barium chloride, barium acetate, barium nitrate, and the like, to produce the novel pigment of the present invention. Not only should the alkaline earth metal salt have a greater solubility in the aqueous medium than its corresponding alkaline earth metal sulfite but the rate and manner of addition of said salt should be controlled. For instance, particularly good results are obtained when, say, calcium chloride is added rapidly to an aqueous medium containing sulfite ions and finely divided silica. To insure rapid intermingling of the reactants violent agitation of the reactants should be effected at the moment the calcium chloride is introduced.

An alkali metal salt, such as sodium chloride, may be present in the alkali metal silicate solution to aid precipitation under certain conditions. Although best results are obtained when sodium chloride is used to aid precipitation, other alkali metal salts may be employed. For example, essentially water soluble alkali metal salts of strong mineral acids, such as sodium sulfate, sodium bromide, sodium nitrate, or trisodium phosphate, or the corresponding potassium or lithium compounds, may be used. When sodium chloride is employed to aid precipitation, it is desirable to use from 5 to 100 grams per liter concentrations thereof. However, where the temperature of reaction is high, for example, above 50 to about 75° C. and the $SiO_2$ content of the solution high, say, above about 50 grams per liter, pigment can be obtained even when no sodium chloride is present.

Precipitation of finely divided silica in pigmentary form having a particle size of 0.01 to 0.05 micron and surface areas in the range of 25 to 300 square meters per gram (as determined by the Brunauer-Emmett-Teller method) may be brought about, therefore, according to this embodiment, and a calcium salt, or salt of other alkaline earth metal capable of precipitating sulfite thereof, may be added to the slurry.

Typical silica slurries of the type required for this last embodiment are produced according to the methods described in the application of Fred S. Thornhill, Serial No. 308,249, filed September 6, 1952, the disclosure of which is incorporated here by reference.

To obtain the silica slurry required for this embodiment by direct precipitation of acid with sodium silicate, it is necessary to conduct the reaction of acid with alkali metal silicate under conditions which must be carefully correlated, as indicated in the Thornhill application. The $SiO_2$ content of the alkali metal silicate must be carefully governed, the concentration of soluble alkali metal salt (such as sodium chloride) in the silicate solution is important, as hereinabove stated, the temperature of reaction, the rate of addition of acid to the solution, and so forth, are all important. To avoid production of a gel, it is important that the acid be added to the sodium silicate. For instance, when sodium silicate is added to an amount of acid which is less than the stoichiometric amount required to completely neutralize the sodium silicate a gel-type product generally results.

The rate of acid addition to the sodium silicate solution is of special importance until sufficient acid has been added to neutralize 50 to 70 percent of the $Na_2O$ content of the silicate. Thereafter, the rate becomes less important and the rate of addition can be increased or decreased without significant change in results.

Thus, precipitation of the silica usually begins after about 30 percent of the acid required to react with the $Na_2O$ content of the alkali metal silicate and produce the sodium salts thereof has been added. Precipitation of the silica is essentially complete after 50 to 75 percent of the theoretical amount of acid has been added. Precipitation begins, therefore, when the ratio of $SiO_2$ to $Na_2O$ is about 5, and appears to be substantially completed when the $SiO_2$ to $Na_2O$ ratio is about 10. Neutralization of the residual 30 to 50 percent of $Na_2O$ may be effected at any convenient rate and, in fact, the remainder may be added instantaneously or at any other convenient rate. In general, the rate used is such that the first half of the neutralization to produce a neutral salt (as distinguished from an acid salt) is conducted in 5 to 1440 minutes.

The sodium silicate used normally should have the composition $Na_2O(SiO_2)_x$ where $x$ is at least 2, usually 2 to 4, including fractional numbers, preferably in the range of 3 to 4. The large amount of acid required to neutralize compositions wherein the ratio of $SiO_2$ to $Na_2O$ is less than 2 makes the process economically objectionable. Silicate solutions containing about 10 to 150 grams per liter (preferably not over 100 grams per liter) of $SiO_2$ are generally subjected to acid neutralization. More concentrated solutions usually are unsuitable unless dilute acids are used in which the water of the acids dilutes the reaction mixture to an $SiO_2$ content in this range.

In most cases the amount of acid added should be sufficient to precipitate substantially all or at least a major portion of the silica in the solution and preferably should be enough to largely neutralize the $Na_2O$ content of the silicate to produce precipitated silica containing less than about 5 percent $Na_2O$, but should not be in excess of that required to produce a silica slurry having a pH below about 6. Even at this slurry pH the silica has a pH above 7. When larger amounts of acid are used, the surface area of the silica rises to an undesirable degree.

When the $Na_2O$ concentration of the silica precipitated is not excessively high, this tendency to increase in surface area in an acid medium may be largely eliminated by heating the silica in an aqueous medium for a suitable period, usually in excess of 30 minutes. This is particularly true where the silica has been precipitated at a temperature below 60° C. to 80° C. It is also true where the silica has been precipitated above 80° C. and the acidification time is less than 30 minutes. Preferably, this heating is effected in the mother liquor in which the silica has been precipitated. However, if desired, the silica may be separated from its mother liquor after precipitation and redispersed in pure water, for example. The preferred heat treating temperature is 80° C. to 100° C. or above. It is usually advantageous to boil the slurry since this is a simple way of maintaining it at the desired temperature. This treatment is given for a period of at least 30 minutes, preferably 2 to 5 hours, at which time the silica is properly conditioned.

The temperature at which the alkali metal silicate of the present invention is neutralized is dependent upon many factors. Among these factors are the ratio of $Na_2O$ to $SiO_2$, the concentration of $Na_2O$ in the alkali metal silicate solution, the concentration of sodium chloride (should it be present), the rate of addition of acid, etc.

Thus, where an alkali metal silicate solution having an $Na_2O$ to $SiO_2$ ratio of 3.36, an $Na_2O$ concentration of 20.3 grams per liter and a sodium chloride concentration of 20 grams per liter is neutralized with an acid at a rate sufficient to introduce the theoretical amount of acid required to neutralize the $Na_2O$ content of the sodium silicate solution in 4 hours, and the acidification is maintained for 7 hours at a temperature of 25° C., a pigment having a surface area of 127 square meters per gram is produced. Should the identical alkali metal silicate solution, exclusive of the NaCl content, be acidified at a rate sufficient to provide the theoretical amount of acid required to neutralize the $Na_2O$ content in 30 minutes, and should this acidification be continued for 1 hour, the temperature of the reaction would have to be increased to about 90° C. or above in order to realize a pigment having approximately the same surface area.

As stated in the aforementioned Thornhill application, it is necessary to conduct the reaction of acid with sodium silicate under carefully correlated conditions in order to obtain the desired pigmentary silica.

Where silica is precipitated according to processes described in the above-mentioned Thornhill application by use of an acid other than sulfurous acid, such as carbonic acid or $CO_2$, the precipitated silica may be dispersed in a solution of sulfurous acid or alkaline earth metal bisulfite, or it may be removed from its mother liquor prior to being dispersed in a solution of sulfurous acid.

As previously stated, the silica slurry as hereinabove described is vigorously agitated during the addition of the alkaline earth metal compound. For instance, when a calcium chloride solution is employed, it is desirable to introduce it rapidly into a silica slurry undergoing intensive agitation in order to insure proper admixture of the reactants. It is also desirable to introduce a stoichiometric excess of chloride, based on the $Na_2O$ content. An excess of 20 to 30 percent, for instance, yields a particularly good product; however, excesses from about 2 to about 50 percent may be used.

When a calcium chloride solution is employed it is convenient to use a solution of 100 grams per liter concentration. Concentrations from about 1 gram per liter to about 700 grams per liter may be employed, however.

Among the novel properties of the pigment of this invention is its good dispersibility in rubber. The novel pigment of this invention possesses a dispersibility which is superior to the dispersibility of the above-mentioned calcium silicate.

The following are typical standard rubber test recipes used to determine the physical characteristics of rubber products containing the novel pigment of the present invention:

TABLE I

| | A | B |
|---|---|---|
| | Parts by weight | Parts by weight |
| GR-S-1500 | 75.0 | 25.0 |
| #1 R. S. S. | | 55.0 |
| Marbon 8000 (styrene-butadiene resin) | 25.0 | 20.0 |
| Zinc Oxide | 5.0 | 5.0 |
| Sulfur | 3.0 | 2.25 |
| Stearic acid | 1.0 | 2.0 |
| Santoflex B (reaction product of acetone and p-amine-diphenyl) | | 0.67 |
| Akroflex C (35% diphenyl-p-phenylenediamine, 65% phenyl-alpha-naphthylamine) | 1.0 | |
| Flexamine (65% of a complex diarylamine-ketone reaction product and 35% n,n' diphenyl-p-phenylenediamine) | | 0.33 |
| Santocure (N-cyclohexyl-2 benzothiazole sulfenamide) | 1.0 | |
| Cumar MH 2½ (polymers of indene, coumarone and associated coal tar compounds) | 5.0 | 5.0 |
| D. O. T. G. (di-ortho-tolyl-guanidine) | 0.25 | 1.2 |
| Altax (Benzothiazyl disulfide) | | 1.0 |
| Red iron oxide | | 4.0 |
| Carbowax 4000 (mixture of polyethylene glycols) | | 2.0 |
| Commercial calcium silicate | 90.0 | |
| Product of Example II | | 64.5 |

TABLE II

| | A | B |
|---|---|---|
| | Parts by weight | Parts by weight |
| GR-S-1000 | 100.0 | 100.0 |
| Zinc oxide | 5.0 | 5.0 |
| Sulfur | 2.0 | 3.0 |
| Phenyl-beta-naphthylamine | 1.0 | 1.0 |
| Thionex (tetramethyl thiuram monosulfide) | .35 | |
| Altax (Benzothiazyl disulfide) | | 1.2 |
| Accelerator 808 (condensation product of butyraldehyde and aniline) | .15 | |
| Methyl tuads (tetramethyl thiuram disulfide) | | 0.15 |
| Circo oil | 5.0 | |
| Cumar MH 2½ (polymers of indene, coumarone and associated coal tar compounds) | | 15.0 |
| Glycol | | 3.5 |
| Commercial calcium silicate | 66.9 | |
| Product of Example II | | 58.5 |

The siliceous pigment prepared according to Example II, when tested in the above standard rubber recipes, imparted properties of tensile, tear and flexure to said rubber far superior to those imparted by the commercial calcium silicate which was used to prepare said siliceous pigment. The rubber compounding needs of calcium silicate and the siliceous pigment of the present invention are necessarily different (as witnessed in Tables I and II above) owing to the curing rates of the respective pigments.

The present invention will be more fully understood by reference to the following illustrative examples. Calcium silicate pigment especially useful for use in the present invention is prepared as follows:

*Example I*

Streams of aqueous sodium silicate solution containing 100 grams per liter of $SiO_2$ as $Na_2O(SiO_2)_{3.36}$ and calcium chloride solution containing 100 grams per liter of calcium chloride and 30 to 40 grams per liter of sodium chloride were fed directly into the central area of a centrifugal pump at 150° F. The rates of flow were adjusted so that calcium chloride was approximately 10 percent in excess over the stoichiometric quantity required for reaction and that the amount of liquid supplied to the pump was about 25 percent below the output capacity of the pump. In consequence, the solutions were subjected to turbulent intermixing in the pump.

The following example teaches a preferred method of preparing the silica-calcium sulfite pigment of this invention:

*Example II*

One thousand five hundred gallons of a calcium silicate-water slurry prepared as in Example I was placed in a turbo-agitated 6000 gallon rubber-lined tank. The calcium silicate solids concentration in the slurry was 8 percent by weight, the remainder being predominantly water. This calcium silicate had an average ultimate particle size of approximately 0.03 micron.

A quantity of sulfurous acid was prepared in a 1500 gallon rubber-lined tank trailer containing 450 gallons of water by running a rubber hose from said tank to a Worthite centrifugal pump and another section of rubber hose from said pump to the tank and circulating, through said hoses, 450 gallons of water from the tank to the pump and then from the pump back to the tank. Sulfur dioxide was injected into the section of the hose leading from said tank to the pump at the rate of 1 to 2 pounds per minute. A total of about 290 pounds of sulfur dioxide was absorbed in the 450 gallon portion of water.

The thus-prepared sulfurous acid was pumped into the bottom of the turbo-agitated tank containing 1500 gallons calcium silicate-water slurry until such time as the pH of the mixture reached 5.1 The reactants were admixed at ambient temperature (22° C. plus or minus 5°); at 75 percent neutralization the reaction temperature was 28.89° C. The rate of addition of the acid was about 1 pound of $SO_2$ per minute. Continuous agitation for an additional 20 minutes lowered the pH to 4.5. The mixture was then aged 1 hour with no agitation. Subsequently, 112 gallons of the calcium silicate-water slurry was added to neutralize the mixture, the final pH being 7. The major portion (100 gallons) was dumped in. The balance (12 gallons) was added carefully to accurately achieve the desired pH.

This slurry was then washed on a filter wheel with 2 passes. Filtration rate for the first pass was 5.3 pounds per hour per square foot. The rate for the second wash was 3.7 pounds per hour per square foot. The average overall rate was 4.5 pounds per hour per square foot. The slurry was then filtered and dried to about 3 percent moisture. The resulting dried product was then milled.

The following example represents a still further embodiment of the present invention:

*Example III*

Eighty-seven gallons of sodium silicate $Na_2O(SiO_2)_{3.36}$ was placed in a 100 gallon rubber-lined tank fitted with a mixer. The silicate was adjusted to 20.3 grams per liter $Na_2O$ concentration and 75° C. temperature. Sulfur dioxide gas was bubbled into the bottom of the tank at a rate calculated to furnish a stoichiometric amount in 210 minutes. Initial precipitation of the silica occurred at 58 minutes. At 190 minutes the pH of the slurry was 6.7 and the $SO_2$ addition was stopped. The resulting slurry was then boiled for one hour. Into this slurry a calcium chloride solution of 100 grams per liter concentration was dumped rapidly while agitating until 30 percent excess chloride was added based on the equivalent $Na_2O$ content. The pH of the resulting slurry was 2.95. Milk of lime was added to adjust the pH to 7.1, and the resulting mixture was then washed in 2 passes on a small filter wheel and dried in trays in an oven.

*Example IV*

The conditions for this example were the same as those of Example III except that the $SO_2$ addition was stopped when the pH of the slurry reached 9.65. Calcium chloride addition to this slurry resulted in a pH of 9.0. No further adjusting of pH was made. The slurry was then washed and dried as in Example III.

The wet filter cake resulting from a washed product slurry of the present invention generally contains from 18 to 23 percent solids, although 8 to 25 percent solids may be present.

The expression "finely divided siliceous pigment" as used in the instant disclosure is intended to exclude gel-type siliceous particulates.

Although the instant invention has been particularly described as to various embodiments thereof, such embodiments are not to be regarded as limitations upon the scope of the invention, except insofar as the appended claims impose limitations thereon.

I claim:

1. A method of preparing a finely-divided silica-alkaline earth metal sulfite pigment which comprises forming an aqueous slurry of finely-divided, precipitated silica having an average ultimate particle size below 0.1 micron having dissolved and dispersed therein alkaline earth metal ions and sulfite ions, the slurry having a pH from about 1.5 to about 6, and reducing the acidity of the slurry to a pH above 6.5 to precipitate a finely-divided, silica-alkaline earth metal sulfite.

2. The process of claim 1 wherein the alkaline earth metal ions are calcium ions and the product is a finely-divided, silica-calcium sulfite pigment.

3. The process of claim 1 wherein the alkaline earth metal sulfite precipitation is effected with such rapidity that precipitation of the finely divided alkaline earth metal sulfite in any portion of the resulting slurry thereof has taken place within one minute from the time of commencement of alkaline earth metal sulfite precipitation in such portion.

4. The process of claim 3 wherein the alkaline earth metal sulfite is calcium sulfite.

5. A method of preparing a finely-divided silica-alkaline earth metal sulfite pigment which comprises reacting an alkaline earth metal silicate having an average ultimate particle size below 0.1 micron with enough sulfurous acid to form an aqueous slurry having a pH from about 1.5 to about 6 having dissolved and dispersed therein alkaline earth metal ions, sulfite ions and finely divided precipitated silica and reducing the acidity of the slurry to a pH above 6.5 to precipitate finely-divided alkaline earth metal sulfite therein.

6. The process of claim 5 wherein the alkaline earth metal silicate is calcium silicate.

7. A method of preparing a finely-divided silica-calcium sulfite pigment which comprises reacting calcium silicate having an average ultimate particle size below 0.1 micron with enough sulfur dioxide to form an aqueous slurry having a pH from about 1.5 to about 6 having dissolved and dispersed therein calcium ions, sulfite ions and finely divided precipitated silica and reducing the acidity of the slurry to a pH above 6.5 to precipitate finely-divided calcium sulfite therein.

8. A method of preparing a finely-divided silica-calcium sulfite pigment which comprises reacting calcium silicate having an average ultimate particle size below 0.1 micron with enough calcium bisulfite to form an aqueous slurry having a pH from about 1.5 to about 6 having dissolved and dispersed therein calcium ions, sulfite ions and finely divided silica and reducing the acidity of the slurry to a pH above 6.5 to precipitate finely-divided calcium sulfite therein.

References Cited in the file of this patent

UNITED STATES PATENTS

| | | |
|---|---|---|
| 1,984,188 | Haywood | Dec. 11, 1934 |
| 2,189,832 | Rafton | Feb. 13, 1940 |
| 2,310,693 | Haywood | Feb. 9, 1943 |
| 2,413,321 | Haywood et al. | Dec. 31, 1946 |
| 2,679,463 | Alexander et al. | May 25, 1954 |
| 2,686,731 | Wainer | Aug. 17, 1954 |
| 2,698,256 | Shea | Dec. 28, 1954 |

FOREIGN PATENTS

| | | |
|---|---|---|
| 129,143 | Australia | Dec. 7, 1945 |